United States Patent [19]
Warburton

[11] Patent Number: 5,846,046
[45] Date of Patent: Dec. 8, 1998

[54] LIFTER/LOADER FOR RECTANGULAR BALES

[76] Inventor: John Robert Warburton, P.O. Box 39, Popular Point, Manitoba, Canada, R0H 0Z0

[21] Appl. No.: 19,037

[22] Filed: Feb. 5, 1998

[51] Int. Cl.$^6$ ........................................... B60P 1/48
[52] U.S. Cl. ........................... 414/552; 414/111; 414/555
[58] Field of Search ........................ 294/104; 414/24.5, 414/24.6, 111, 529, 552, 555, 776, 783

[56] References Cited

U.S. PATENT DOCUMENTS

| | | | |
|---|---|---|---|
| 4,909,694 | 3/1990 | Peters et al. | 414/24.5 |
| 5,288,193 | 2/1994 | Warburton et al. | 414/24.5 |

*Primary Examiner*—Janice L. Krizek
*Attorney, Agent, or Firm*—Jones, Tullar & Cooper, PC

[57] ABSTRACT

The invention provides apparatus for lifting a large parallelepiped bale of hay or straw from the ground and then loading the bale on a transport vehicle such as a flat bed trailer or truck. The apparatus includes a transport frame pivotally connected to one side of the vehicle for movement between a lower working position, an intermediate transition position and a vertical transport position. A lifting frame is pivotally connected to the distal end of the transport frame for pivotal movement about an axis that is angled relative to the transport frame. The axis is generally parallel to a line that extends diagonally of a bale from one lower inside corner to the opposite upper outside corner. A roller frame fixedly mounted to the lifting frame carries a pair of rollers, a stop member to properly locate a bale relative to the roller frame, and a pivotable clamp for clamping a bale against the roller frame. In operation the bale is clamped against the roller frame, the roller frame is pivoted upwardly and is simultaneously rotated inwardly by the lifting frame until the bale is normal to the vehicle and at the level of the support surface thereof. The rollers are operated to move the bale onto the support surface and then the entire apparatus is returned to its original position to accept another bale for loading onto the transport vehicle.

10 Claims, 11 Drawing Sheets

LIFTER/LOADER FOR RECTANGULAR BALES

The present invention relates to a device for lifting and loading bales of hay or straw and in particular to a device for lifting rectangular or parallelepiped bales of hay or straw from the ground to a transport vehicle therefor.

BACKGROUND OF THE INVENTION

Harvesting of standing crops, such as hay, usually results in the hay being gathered and formed into bales by a baling machine towed behind a tractor. The baling machine forms the hay or straw into bales which may be cylindrical or rectangular (parallelepiped) in nature. Rectangular bales may be small in size, having a length of less than a meter, or they may be longer with a length of up to 2½ meters and a height and width of about 1.2 meters. Needless to say these large bales are very heavy and it is necessary to utilize specialized equipment to lift the bales to a transport vehicle such as a flat bed truck or a trailer for transport from the field to a storage facility such as a barn. These large bales are too big and too heavy for several strong men to lift comfortably.

Equipment for lifting large rectangular bales of hay or straw do exist. One machine is drawn behind a tractor and is offset to one side thereof. This machine has two arms than clamp the bale at the ends thereof. The machine then lifts the bale and turns it through 90°, elevates it through a meter or more, and then moves the bale onto the load rack of a trailer or truck. Another machine clamps the bale along its long sides, lifts it through 180°, and elevates it through a meter or more before depositing it on the load rack of the trailer or truck. Both of these machines require extremely strong components since the bale has to be elevated through a considerable height and the rotating movements are performed while the bale is substantially cantilevered relative to the transport vehicle. The moving components of such equipment are typically driven under hydraulic pressure and it is necessary to provide heavy duty cylinders and pumps in order to ensure reliable operation thereof.

SUMMARY OF THE INVENTION

There is a need for a more compact and less expensive device for lifting and loading rectangular bales of hay and straw, especially large bales, onto a transport vehicle. The present invention achieves that need with an apparatus that clamps the bale along the long sides thereof and simultaneously lifts and rotates the bale through 90° relative to the direction of travel, bringing it up to the level of the bed of the transport vehicle. Instead of placing the bale on the transport vehicle bed, as with the prior art, the apparatus of this invention includes power rollers that move the bale laterally of the apparatus and the transport vehicle so as to move the bale onto the vehicle bed. With the present invention it is not necessary that the bale be lifted so high that it can be deposited downwardly onto the vehicle bed; the bale need only be elevated to the height of the bed, about 0.5 to 1.5 meters above the ground. Also, since the lifting and rotating steps are performed simultaneously, the apparatus is able to operate in close proximity to the transport vehicle and the problems associated with cantilevered loads are diminished. The apparatus of the invention is less complex than prior art equipment and the hydraulic cylinders and pumps may be of a lighter duty than those of the prior art.

Broadly speaking, therefore, the present invention may be considered to provide apparatus for lifting a generally parallelepiped bale of hay or straw from a ground position to a transport vehicle support surface above the ground, the bale having generally rectangular front, rear, top, bottom and end surfaces, comprising: a transport frame pivotally connected at one end thereof to one side of the transport vehicle for movement between a lower working position, an intermediate transition position and a travel position; a lifting frame pivotally attached to the opposite end of the transport frame about an axis angled with respect to the transport frame such that the angled axis is generally parallel to a line extending from one corner of a cube defined within the bale centrally thereof diagonally to the opposite corner of the cube; a roller frame connected to the lifting frame and including at least two parallel driven rollers therein; movable clamping means connected to the roller frame for clamping a bale immovably against the roller frame; and means for independently moving each of the transport frame, the lifting frame, the rollers, and the clamping means; whereby in use the clamping means is operated to clamp a bale against the roller frame, the transport frame and the lifting frame are operated simultaneously to lift the bale from the ground and to rotate the bale about the angled axis to an elevated position normal to its ground position and to the transport vehicle, and the rollers are operated to move the bale laterally from the roller frame onto the transport vehicle support surface when the transport frame is at its intermediate transition position.

DESCRIPTION OF THE PREFERRED EMBODIMENT

Figure 1:
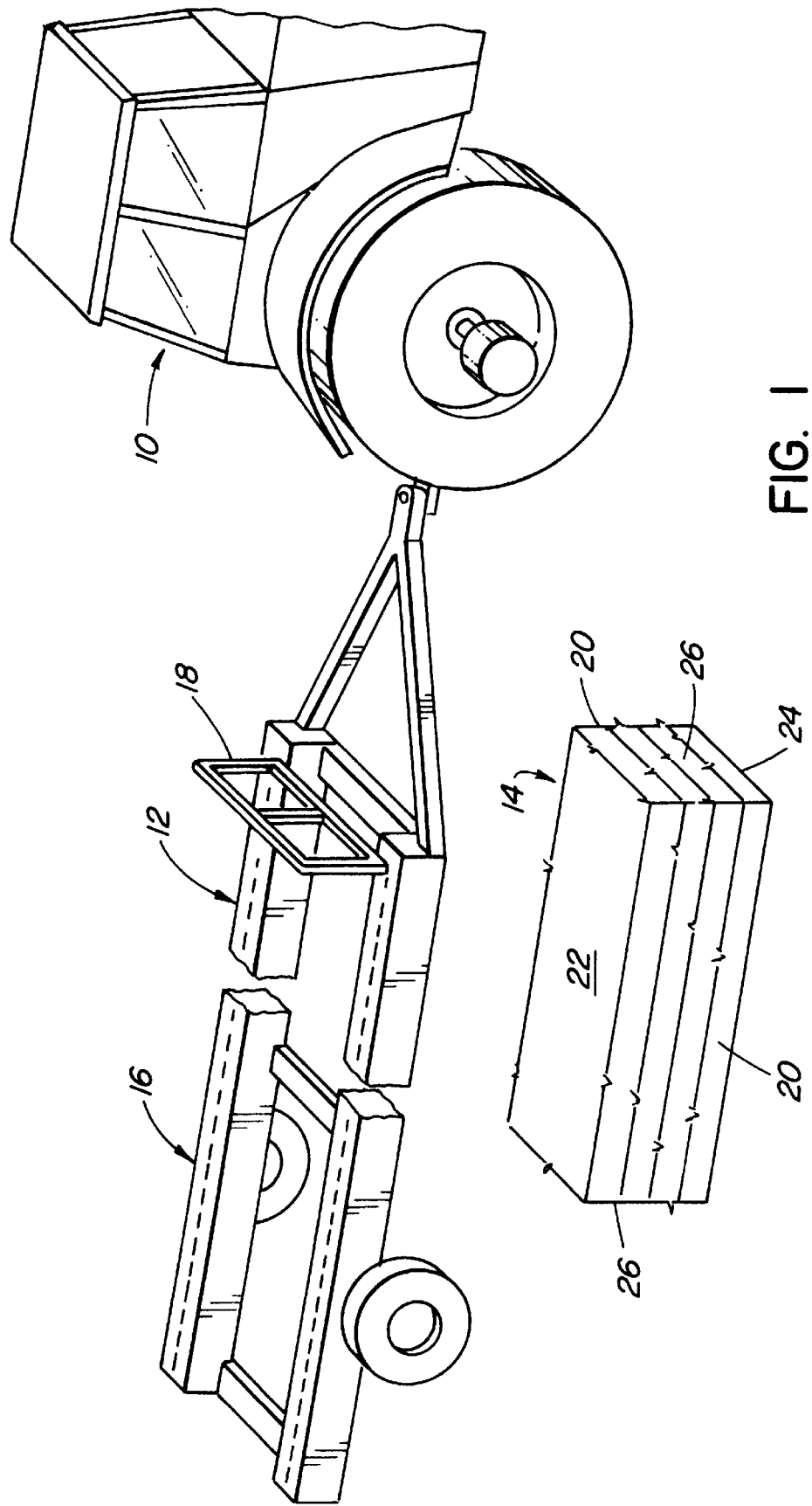
FIG. 1 shows schematically a tractor with a transport vehicle and a bale to be loaded on the transport vehicle.

FIG. 1 illustrates in perspective, and somewhat schematically, a tractor 10 towing a bale transport trailer 12 along a row of rectangular or parallelepiped bales 14 of hay or straw in a field. The trailer is shown as including powered conveyor means 16 thereon, connected to a rack member 18, for moving bales from a forward end of the trailer towards the rear thereof. A bale 14 has elongated rectangular side walls 20, 20, rectangular top and bottom walls 22, 24 respectively, and generally square end walls 26, 26. As indicated above a large rectangular bale will have a length of about 2½ meters, a height of about 1.2 meters, and a width of about 1.2 meters. A typical large rectangular bale will weigh about 700 to 1000 kilograms.

Figure 2:
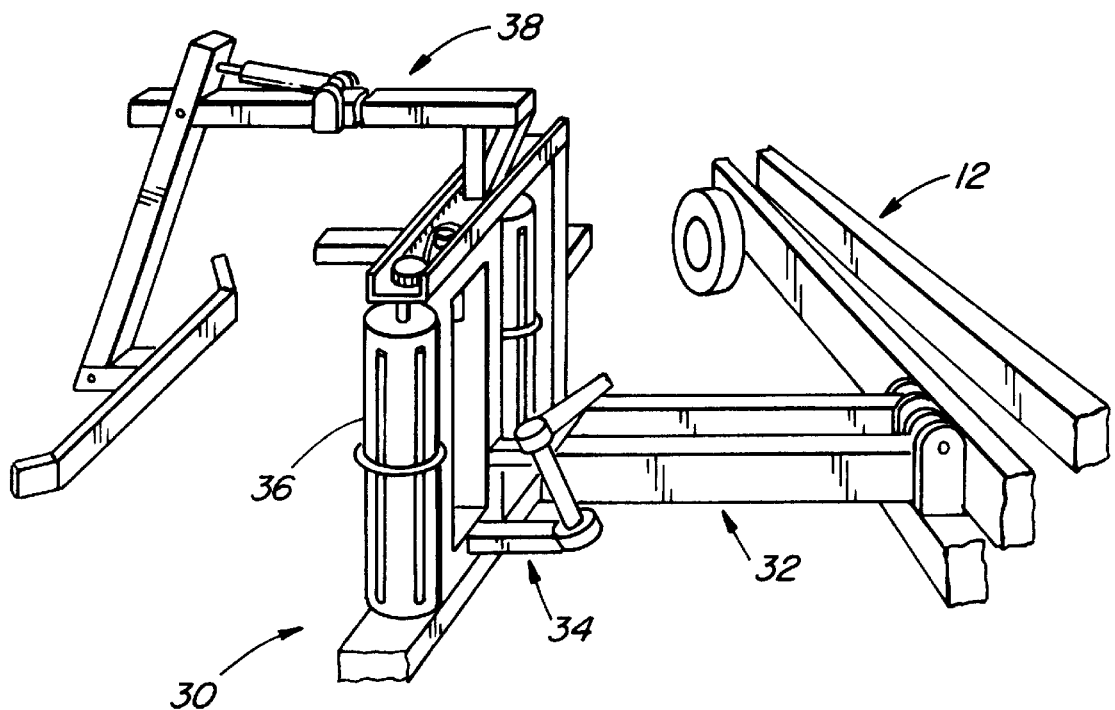
FIG. 2 shows a perspective view of the major components of this invention in relation to a transport vehicle.

FIG. 2 illustrates the trailer 12 with the apparatus 30 of the present invention secured thereto. The apparatus of this invention includes a number of components which co-operate together to achieve the benefits mentioned above. In particular, the apparatus includes a transport frame 32 which is pivotally connected at a proximal end thereof to one side of the transport trailer 12 and is movable between a lower working position, an intermediate transition position, and a travel position, all to be described hereinafter. A lifting frame 34 is pivotally connected to the opposite or distal end of the transport frame about an axis which is angled relative to the transport frame, such that the axis is generally parallel to a line which extends diagonally from a lower inside corner at one end of a cube defined centrally within the bale to the upper outside corner of the cube (see FIG. 4A). A roller frame 36 is secured to the lifting frame 34 and includes at least two parallel driven rollers therein. The roller frame carries movable clamping means 38 which are adapted to clamp a bale lengthwise against the roller frame. Means, such as hydraulic cylinders, are provided to independently move each of the transport frame 32, the lifting frame 34, the roller frame 36 and the clamping means 38 during operation of the apparatus of this invention.

Figure 3:
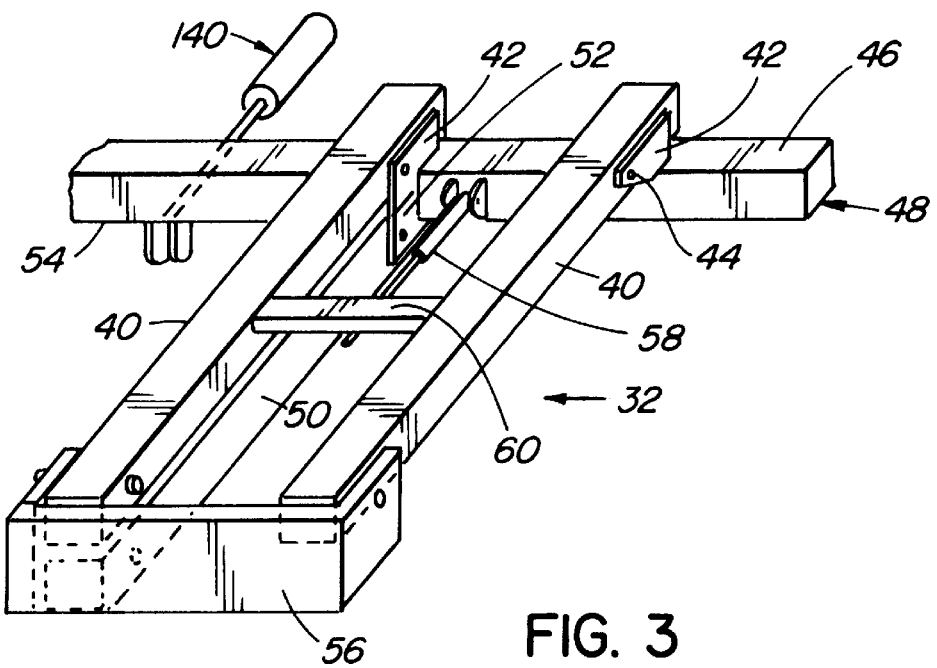
FIG. 3 shows a perspective view of the transport frame of this invention.

FIG. 3 shows a perspective view of the transport frame 32 of this invention. That frame includes a coplanar pair of first elongated channel or box frame members 40. At the proximal end thereof these frame members are located between sets of lugs 42 and are pivotally connected thereto as by pins 44. The lugs 42 may be welded directly to the bed of the transport vehicle, but preferably they are welded as shown to the upper surface 46 of an elongated mounting bar 48 which in turn is pivotally mounted in conventional fashion to the transport vehicle along one side thereof. A second elongated frame member 50 is located below one of the first frame members and is pivotally connected at a proximal end thereof to the transport vehicle, preferably to lugs 52 welded to the lower surface 54 of the mounting bar 48. A third frame member 56 is pivotally connected to the distal ends of the first and second frame members so as to define a parallelogram linkage, with the third frame member always being oriented generally vertically as the transport frame is pivoted upwardly or downwardly. First hydraulic cylinder means 58 are located between the first frame members 40 with the inner or cylinder end thereof being pivotally connected to the mounting bar 48 and the outer or rod end being pivotally connected to a cross bar 60 bridging the first frame members. The cylinder 58 is used to raise and lower the transport frame relative to the mounting bar 48 and the transport vehicle 12.

Figure 4:
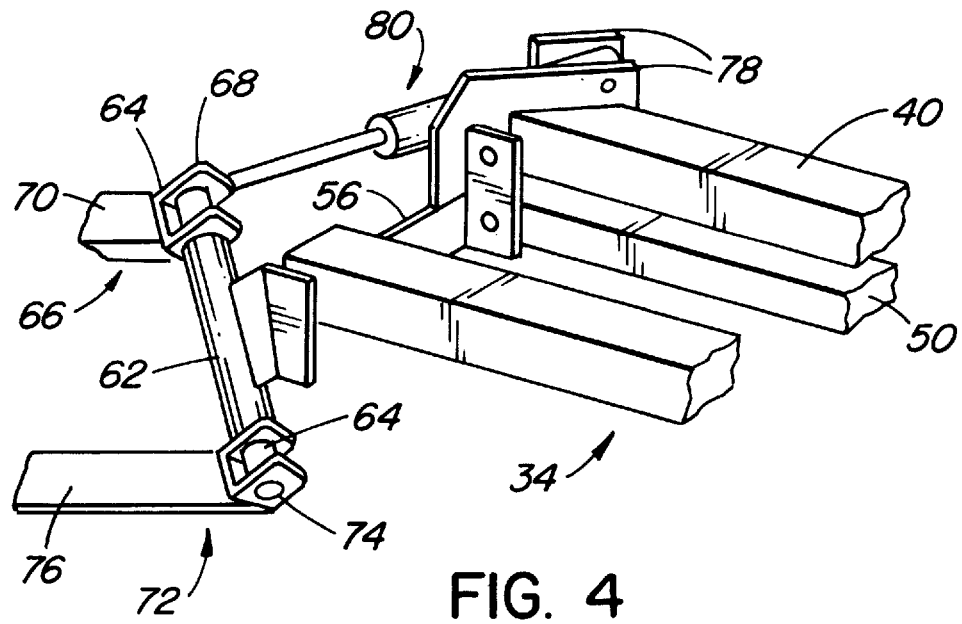
FIG. 4 shows a perspective view of the lifting frame of this invention.
Figure 4A:
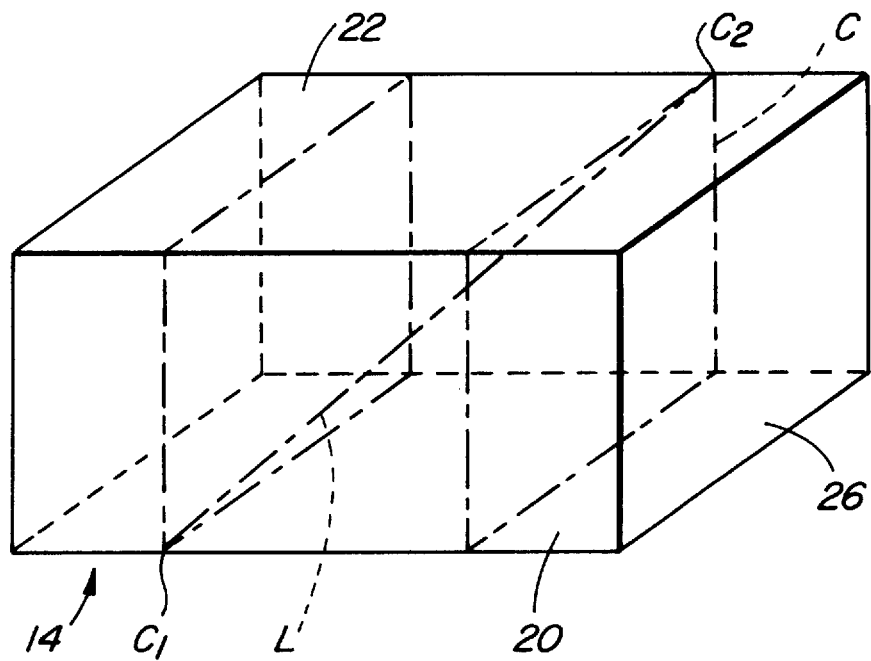
FIG. 4A shows a perspective view of a bale and the line defining the orientation of the lifting frame.

FIG. 4 illustrates the lifting frame 34 which is fixedly secured to the frame member 56 of the transport frame. The lifting frame includes a cylindrical bushing member 62 welded to one end of the frame member 56 at an angle thereto. That angle is determined as shown in FIG. 4A. Therein it is seen that a line L is drawn diagonally from a lower inside corner $C_1$ at one end of a cube C defined centrally within the bale to the upper outside corner $C_2$ at the other end of the cube. This line L for a typical large bale will define the angled axis of the bushing as being about 35.3° up from horizontal and about 35.3° out from parallel to the direction of travel.

The bushing 62 carries therein a pivot pin 64 which projects from each end thereof. A first pivot frame member 66 is mounted to the pivot pin at the upper end thereof, the pivot frame member comprising a U-shaped first portion 68 which extends radially of the pivot pin and a straight second portion 70 which is welded to portion 68 and extends therefrom at an angle thereto. A second pivot frame member 72 is mounted to the pivot pin at the lower end thereof, this pivot frame member comprising a U-shaped first portion 74 which extends radially of the pivot pin and a straight second portion 76 which is welded to portion 74 and extends therefrom at an angle thereto. The second portion 76 is longer than the first portion 70 and these portions are welded to the roller frame such that the roller frame is maintained in a generally vertical orientation in its basic working condition, as will be described hereinafter.

At the end opposite the bushing 62 the frame member 56 carries mounting lugs 78 for the cylinder end of a hydraulic cylinder 80. The rod end of this cylinder is pivotally connected to the first pivot frame member first portion 68 so as to apply pivoting forces to the pivot frame members 66 and 72 as connected together by the pivot pin 64.

Figure 5:
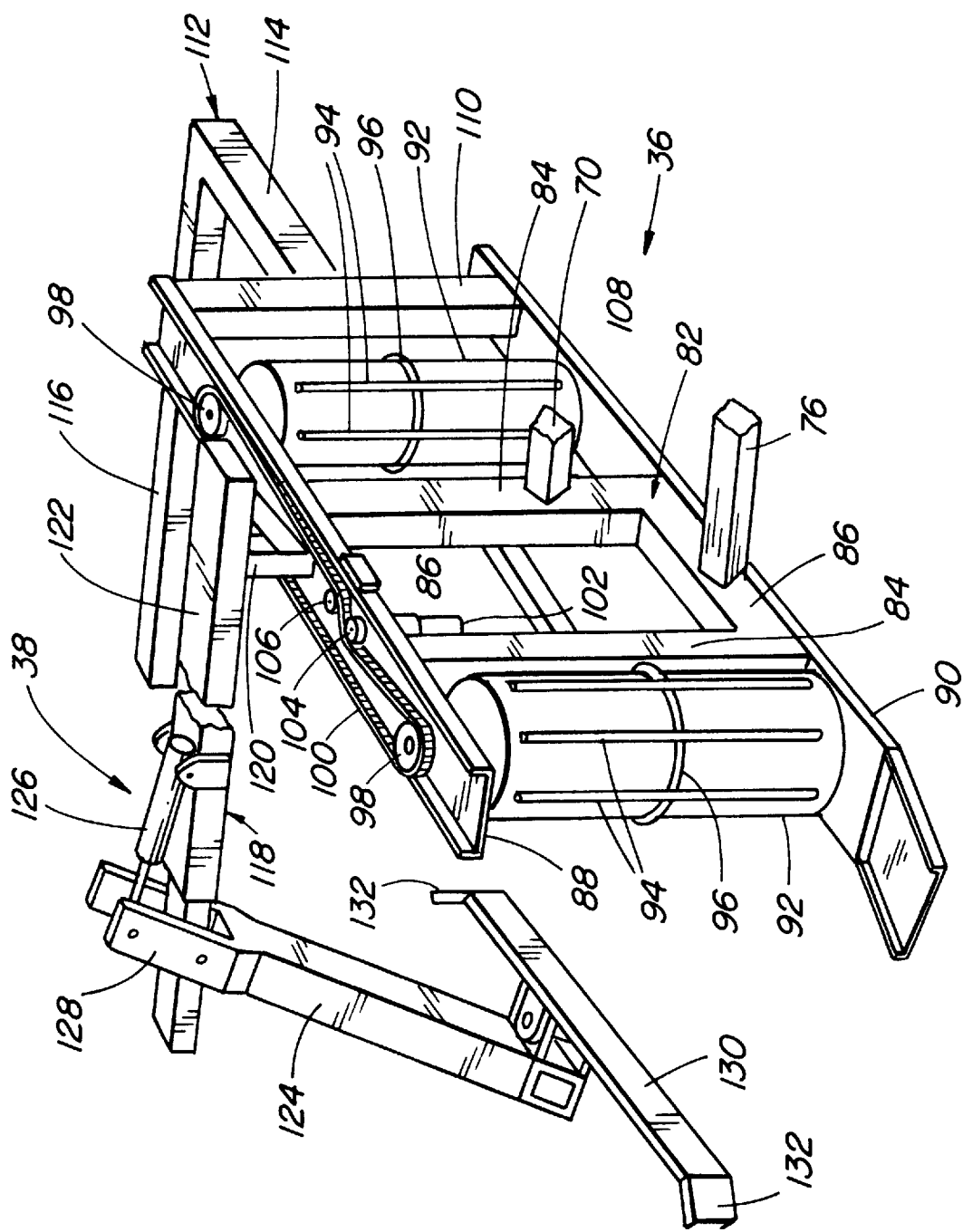
FIG. 5 shows a perspective view of the roller frame of this invention.

FIG. 5 illustrates the roller frame 36 as utilized with this invention. It includes a central rectangular frame 82 having side and end members 84 and 86 respectively. Mounting rails 88, 90 extend along respective end member 86 and beyond the side members 84 as shown. The rollers 92 as used with the invention are mounted in suitable bushings carried by the mounting rails and extend therebetween parallel to the side members 84. Each roller 92 is cylindrical in nature with a diameter somewhat greater than the thickness of the side and end members 84, 86 and each roller carries a plurality of narrow longitudinally extending raised ribs 94 circumferentially spaced thereon as well as a central circumferentially extending rib 96. Outboard of mounting rail 88 and at one end thereof the roller shaft of each roller mounts a sprocket 98 about which is entrained an endless drive chain 100. An hydraulic motor 102 is affixed to the mounting rail 88 such that a drive shaft thereof extends through the mounting rail and carries a drive sprocket 104 which, in turn drivingly engages the chain 100. An idler sprocket 106 is mounted to a movable bracket 108 on the mounting rail 88 so that the sprocket 106 engages the chain 100 opposite the sprocket 104 and can be adjusted in position so as to adjust the tension in the chain 100. When the motor 102 is operated it will rotate the two rollers in the same direction.

With reference to FIG. 5 it will be seen that the longer 76 of the first and second pivot frame member second portions is welded to the lower of the roller frame central frame end members 86 while the shorter 70 of the second portions is welded to the adjacent side member 84.

At the rearward or downstream end of the roller frame 36 there is another transverse mounting member 110 and an L-shaped stop member 112 is secured to that member. The stop member has one leg 114 which is parallel to the mounting rails 88, 90 and projects rearwardly of the roller frame. The other leg 116 of the stop member projects at right angles to the leg 112 .

Also shown in FIG. 5 is the clamping mechanism 38. That mechanism includes an L-shaped frame member 118 which has one leg 120 welded to the mounting rail 88 between the runs of the chain 100 and its other leg 122 projecting at right angles to leg 120 normal to the roller frame 36. Adjacent an outer end of the leg 122 there is pivotally mounted thereto an elongated bar 124 and an hydraulic cylinder 126, the cylinder end of which is pivotally mounted to the leg 122 while the rod end thereof is pivotally connected to a proximal end extension 128 of the bar 124 to effect movement of the bar. At the distal end of the bar 124 is a clamping bar or plate 130 which is pivotally mounted to the bar 124 at generally its center point. Preferably each end of the bar 130 has an upturned portion 132.

Figure 6:
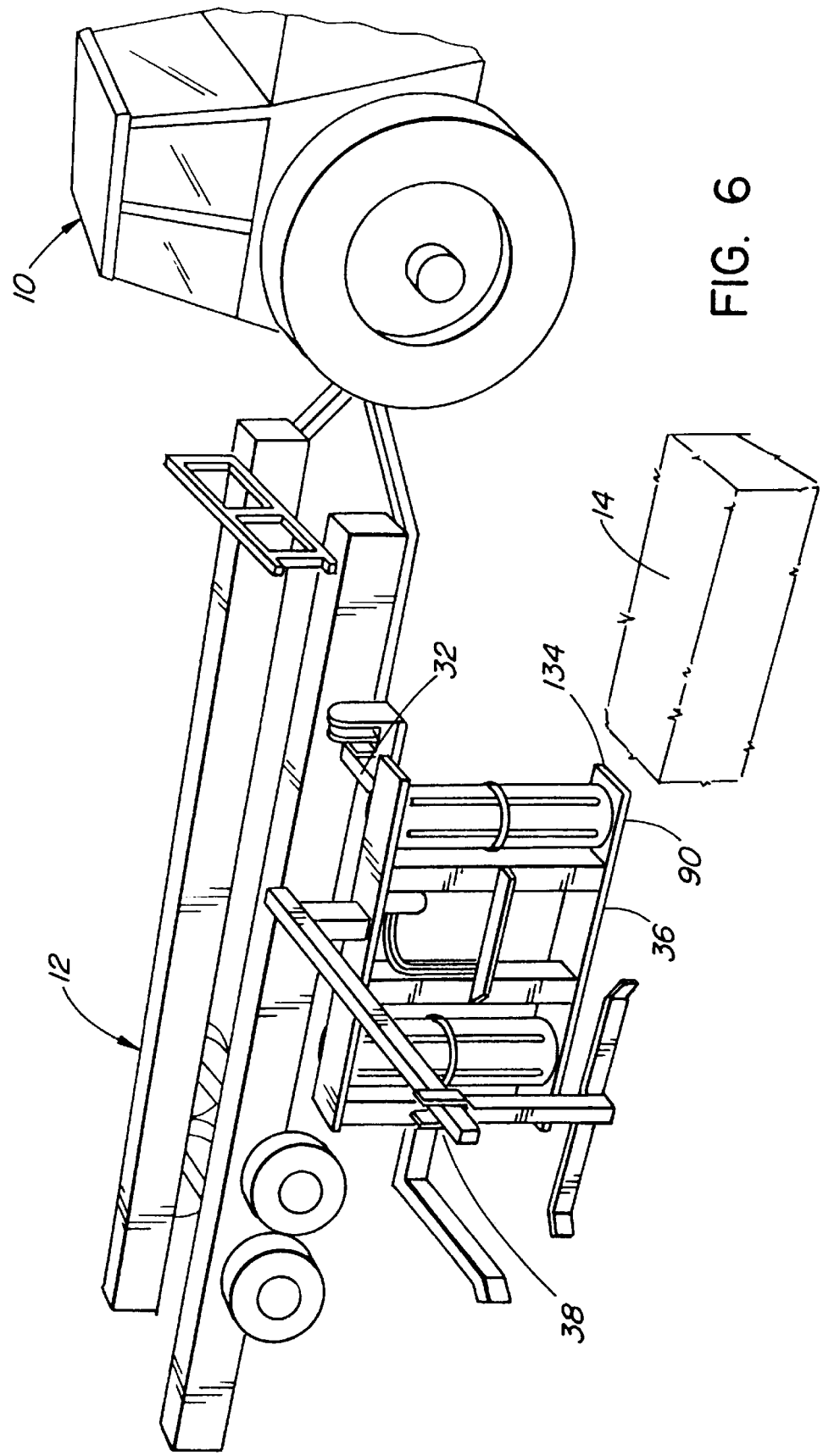
FIGS. 6 to 11 illustrate the operation of the apparatus of this invention.

The operation of the apparatus of this invention will now be described with reference to schematic FIGS. 6 to 11. FIG. 6 shows the tractor 10, with trailer 12 attached, approaching a rectangular or parallelepiped bale 14 with the apparatus of this invention in its lowermost or working position or orientation. In this orientation the mounting rail 90 of the roller frame is sliding on the ground and the roller frame is generally vertical. If desired the mounting rail 90 can have an upturned forward or upstream end 134 to facilitate movement over the ground.

Figure 7:
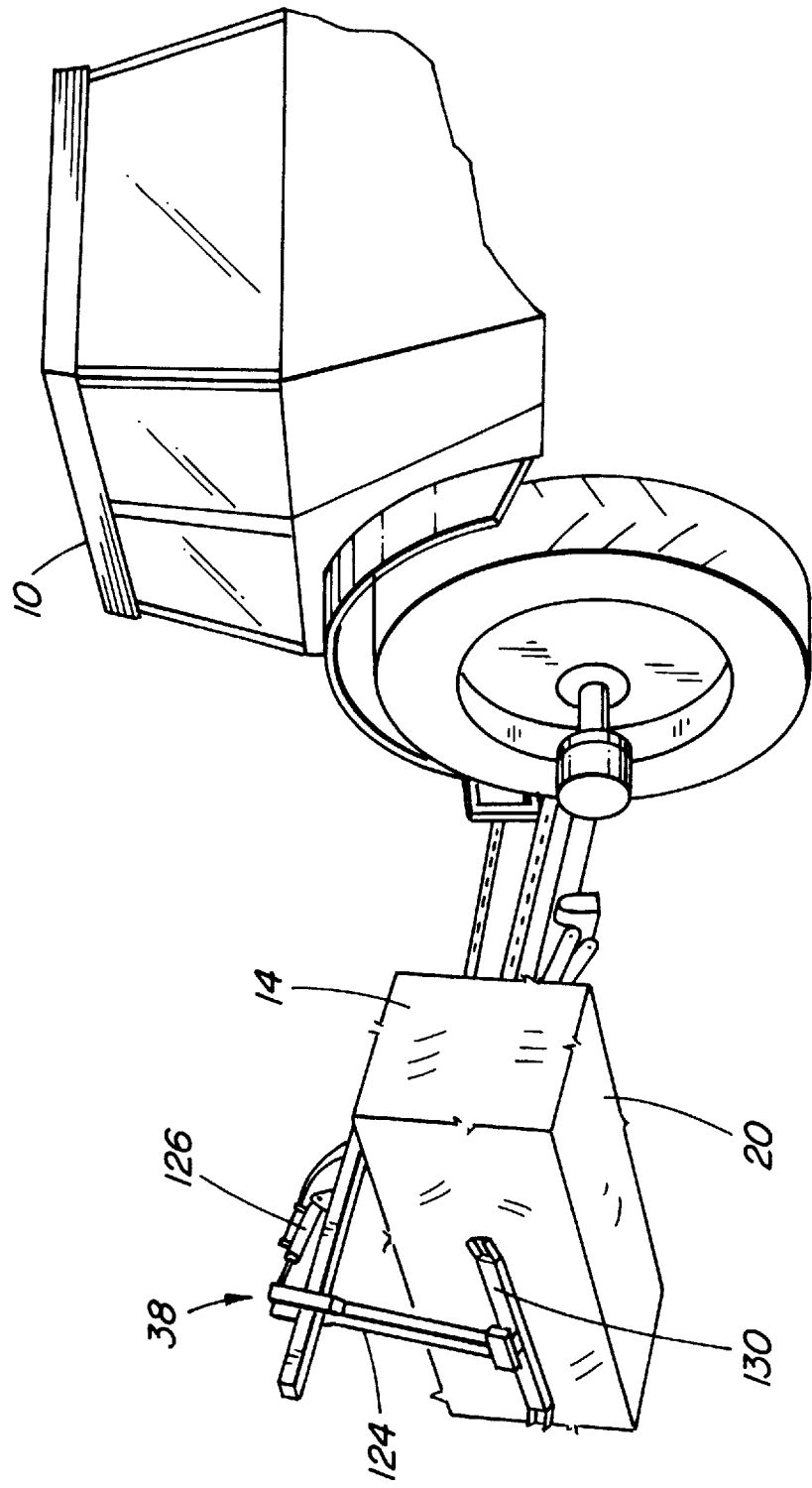

FIG. 7 shows that the roller frame has engaged the bale 14 and has moved the bale forwardly due to the pushing effect caused by engagement of the leg 116 of the stop member 112 against the end wall 26 of the bale. Simultaneously with this engagement the cylinder 126 is operated to pivot the elongated bar 124 inwardly of the roller frame so as to bring the clamping bar 130 into engagement with the outer side wall 20 of the bale 14. Under the effects of the clamping mechanism the bale is forced into contact with the roller frame and the components thereof.

Figure 8:
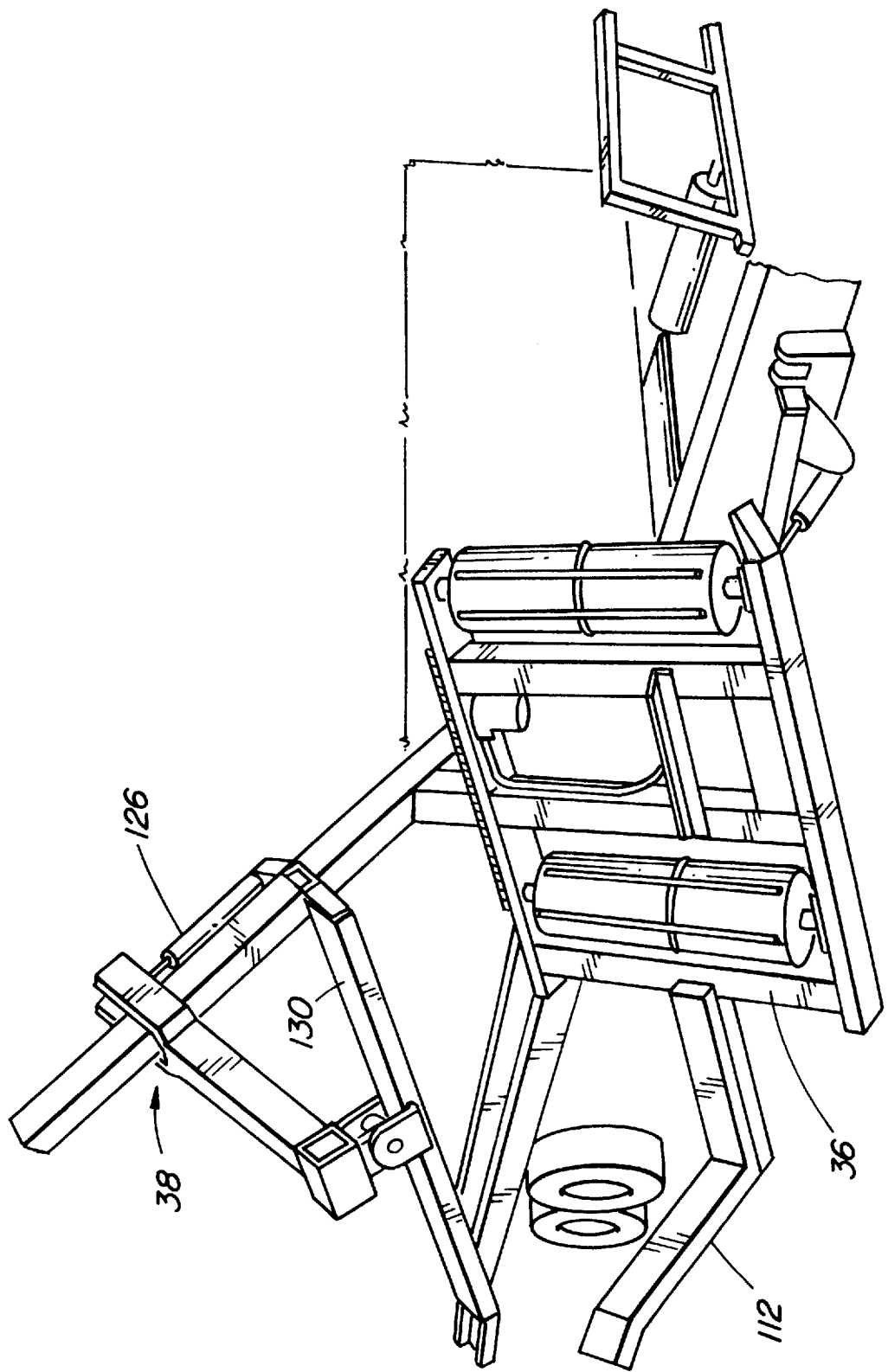
Figure 9:
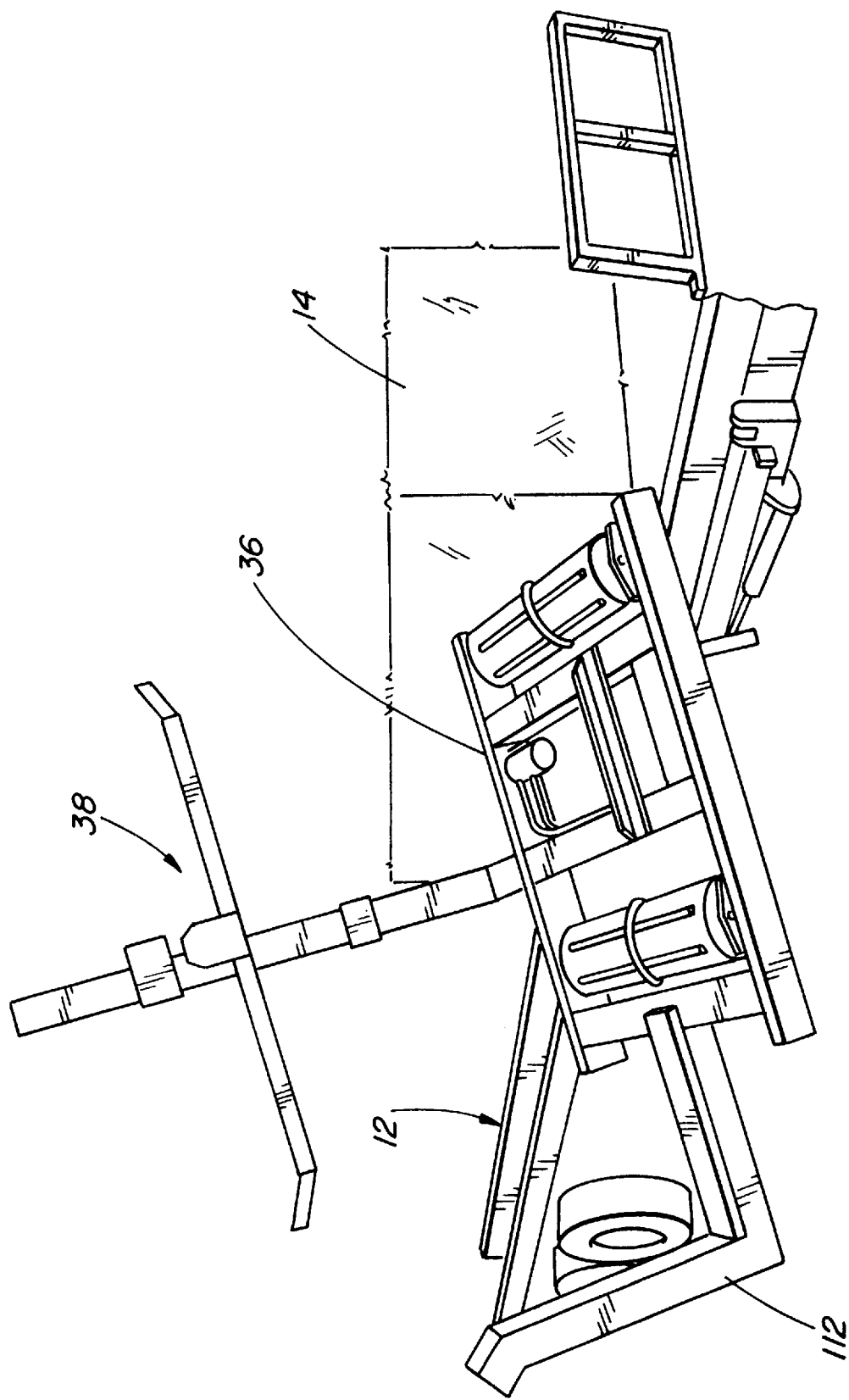
Figure 10:
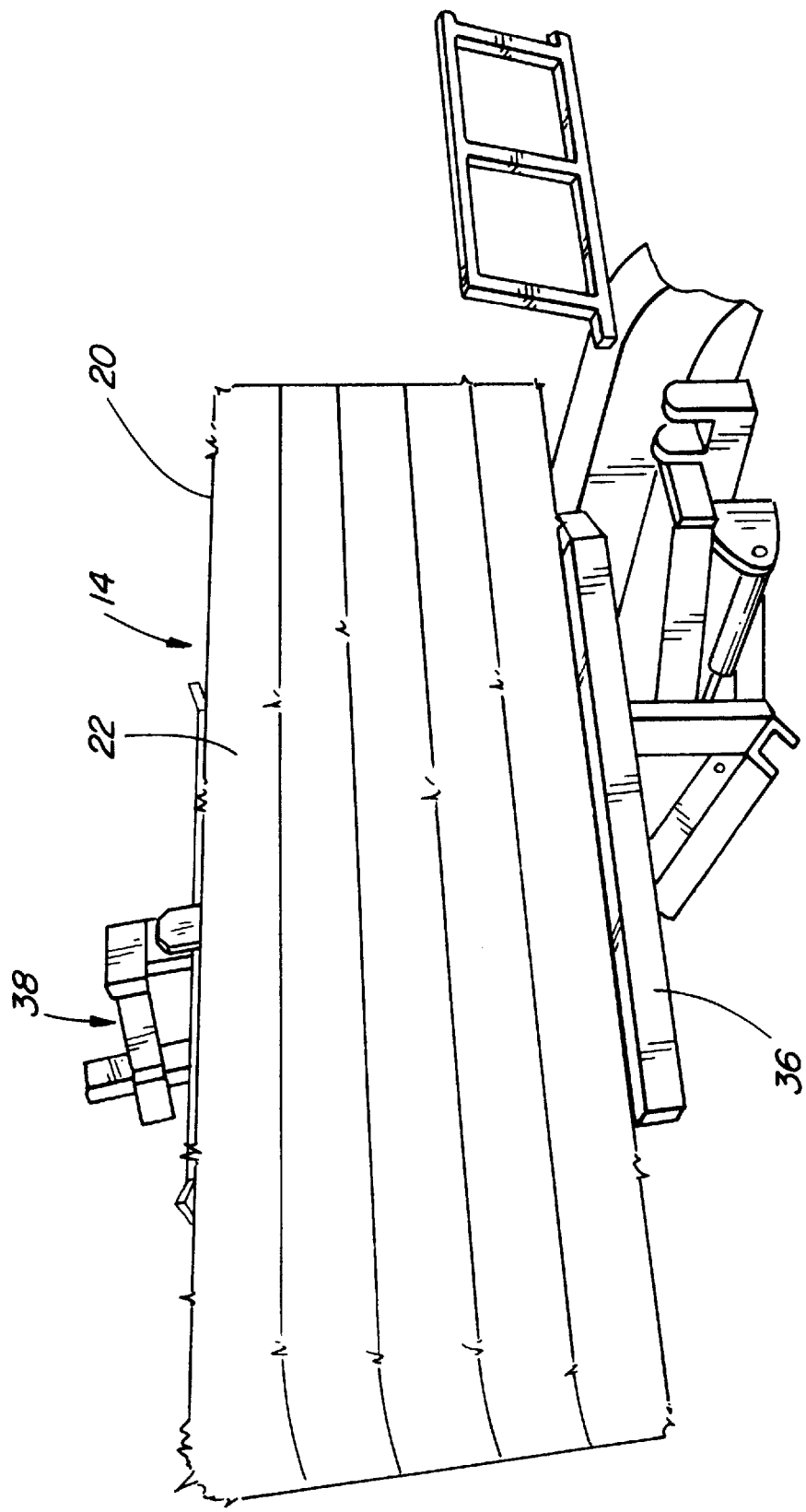

After the bale has been clamped in the roller frame 36 and while the tractor is still moving forwardly, the operator activates the hydraulic cylinders 58 and 80 together. This results in the transport frame 32 moving upwardly somewhat. As shown in FIG. 8 the lifting frame 34 starts to pivot about the axis defined by the bushing 62, raising and rotating the roller frame 36. As the tractor advances, as seen in FIG. 9, the roller frame 36 is rotated and twisted upwardly and inwardly relative to the transport vehicle to a position just at or possibly slightly above the bed of the vehicle as seen in FIG. 10. In this position the bale is normal to the direction of travel as well as to the transport vehicle. Furthermore, due to the rotating and twisting effect of the lifting frame 34 the outer side wall 20 of the bale is now the top wall thereof.

Figure 11:
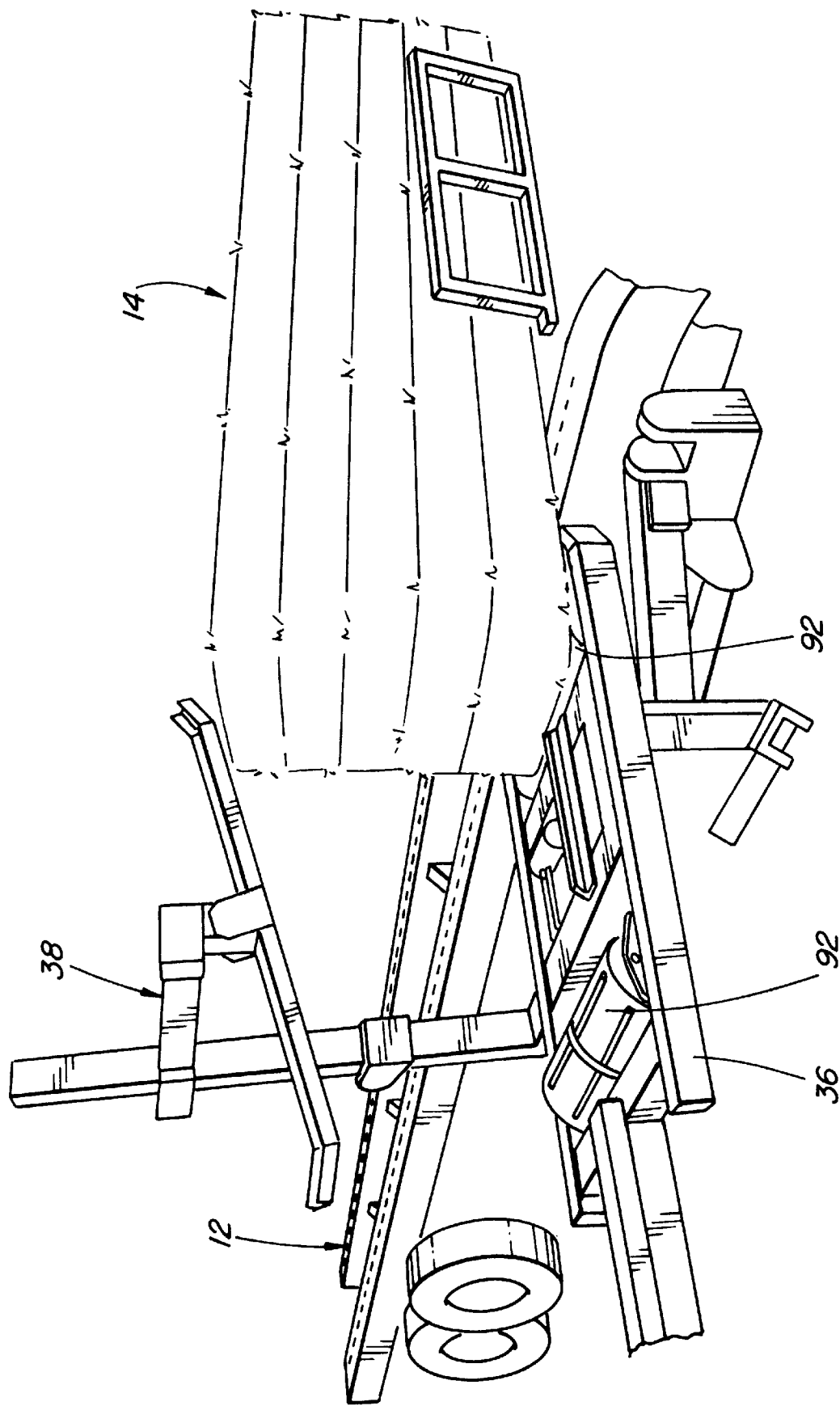

Once the bale is in the position of FIG. 10 the hydraulic motor 102 is activated so as to rotate both rollers 92. Due to the weight of the bale resting on the rollers, and aided by the ribs 94, 96, the rollers drive the bale from the roller frame onto the support surface of the transport bed (FIG. 11). Once the bale is on board the transport vehicle the various hydraulic cylinders are operated in reverse so as to lower the transport frame 32, pivot the lifting frame 34 to bring the roller frame 36 back to its vertical orientation, and move the bar 124 outwardly to accept another bale.

When the collection of bales is complete another hydraulic cylinder 140 (FIG. 3) can be operated to pivot the mounting bar 48 and thereby elevate the transport frame 32 to a vertical orientation for transport purposes. The cylinder 80 can also be operated to rotate the roller frame 36 into a vertical orientation so as to reduce the width of the apparatus for transport purposes.

Figure 12:
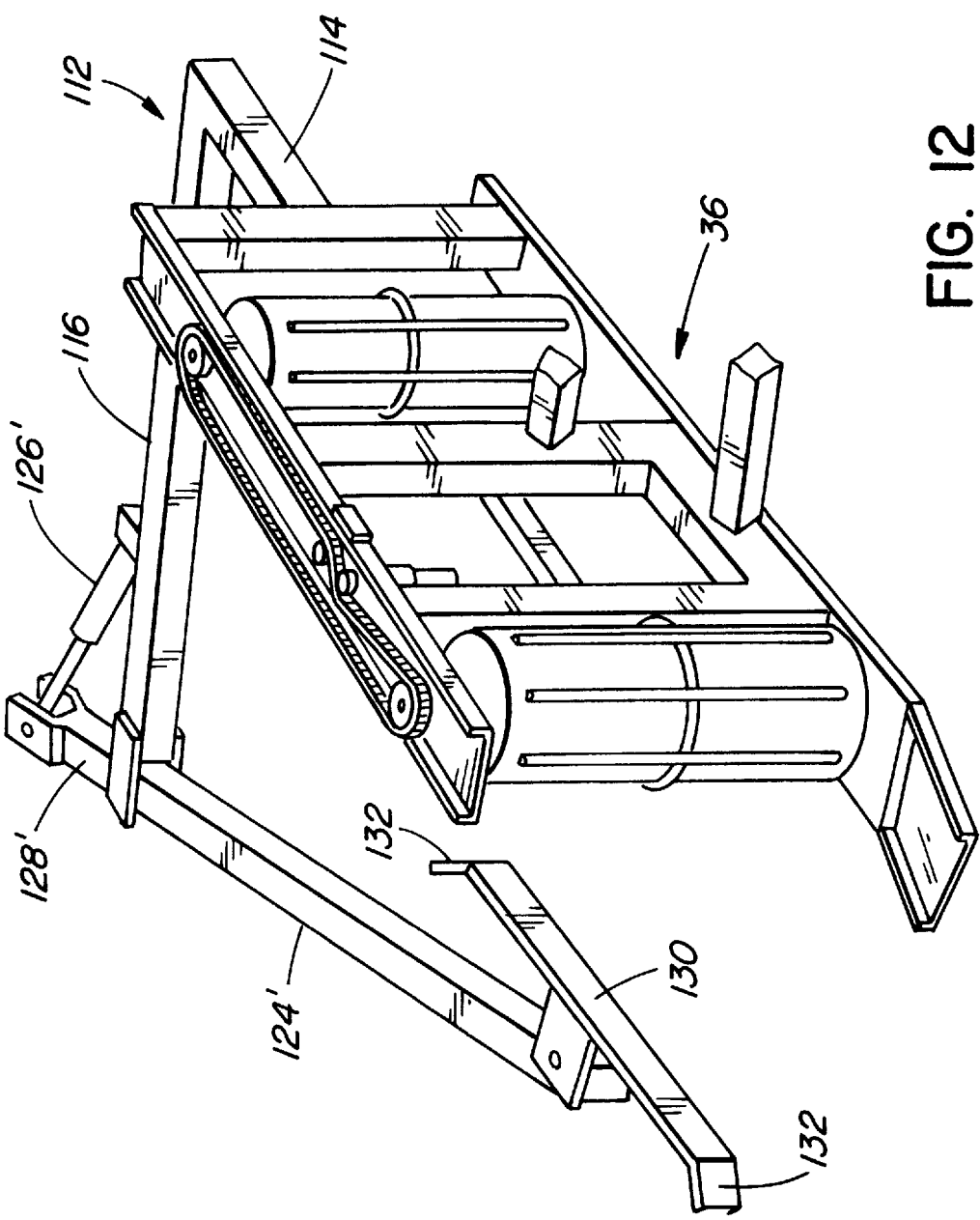
FIG. 12 shows a view similar to FIG. 5 with an alternate clamping means illustrated therein.

FIG. 12 illustrates an alternate construction for the clamping means discussed with regard to FIG. 5. In this alternate construction the frame member 118 is eliminated and the elongated bar 124' is pivotally connected to the outer end of the leg 116 of the stop member. A hydraulic cylinder 126' has its cylinder end pivotally mounted to the outer surface of the leg 116 and its rod end pivotally connected to a proximal end extension 128' of the bar 124' to effect movement of the bar. The clamping bar or plate 130 is pivotally mounted at generally its center point to the distal end of the bar 124', with the clamping bar 130, the elongated bar 124' and the leg 114 of the stop member all being generally coplanar with each other. The operation of the invention with the alternate clamping means utilized therein is exactly the same as with the first-described version of the clamping means. However, there are fewer parts required and the cost of manufacture is somewhat less.

It will be seen that the present apparatus effectively and quickly lifts a rectangular or parallelepiped bale of hay or straw from the ground and rotates it for loading onto a transport vehicle. The bale need not be lifted much higher than the height of the support surface of the transport vehicle because the rotation performed on the bale is accomplished adjacent the transport vehicle and not above it. The rotation effect is achieved as the transport vehicle advances across the field to the next bale to be lifted and loaded and hence there is no lost time during the operation. Unlike prior art equipment it is not necessary to stop the forward progress of the transport vehicle while the loading operation is taking place.

The foregoing has described the best mode of putting the invention into effect as presently contemplated. It is possible that skilled workmen could modify the apparatus to suit particular needs but it is expected that such modifications would not depart from the spirit of the present invention as defined by the claims herein.

I claim:

1. Apparatus for lifting a generally parallelepiped bale of hay or straw from a ground position to a transport vehicle support surface above the ground, said bale having generally rectangular front, rear, top, bottom and end surfaces, comprising: a transport frame pivotally connected at one end thereof to one side of said transport vehicle for movement between a lower working position, an intermediate transition position and a travel position; a lifting frame pivotally attached to the opposite end of said transport frame about an axis angled with respect to said transport frame such that said angled axis is generally parallel to a line extending from one corner of a cube defined within a bale centrally thereof diagonally to the opposite corner of the cube; a roller frame connected to said lifting frame and including at least two parallel driven rollers therein; movable clamping means connected to said roller frame for clamping a bale immovably against said roller frame; and means for independently moving each of said transport frame, said lifting frame, said rollers, and said clamping means; whereby in use said clamping means is operated to clamp a bale against said roller frame, said transport frame and said lifting frame are operated simultaneously to lift said bale from the ground and to rotate said bale about said angled axis to an elevated position normal to its ground position and to said transport vehicle, and said rollers are operated to move said bale laterally from said roller frame onto said transport vehicle support surface when said transport frame is at its intermediate transition position.

2. The apparatus of claim 1 wherein said transport frame includes a pair of coplanar first frame members pivotally connected at a proximal end thereof to said transport vehicle, a second frame member located below one of said first frame members and pivotally connected at a proximal end thereof to said transport vehicle, a third frame member pivotally connected to a distal end of each of said first frame members and said second frame member to define a parallelogram linkage, and first hydraulic cylinder means connected between said transport vehicle and said first frame members for moving said transport frame between said lower, intermediate and travel positions thereof.

3. The apparatus of claim 2 wherein said lifting frame includes a bushing member fixedly attached to said third frame member of said transport frame along said angled axis and positioned adjacent the distal end of the other of said first frame members of said transport frame, pivot pin means received in said bushing and projecting from each end thereof, a first pivot frame member mounted on said pivot pin at an upper end thereof and secured to said roller frame, a second pivot frame member which is longer than said first pivot frame member, is mounted on said pivot pin at a lower end thereof and is secured to said roller frame, and second hydraulic cylinder means connected between said one of said first frame members and said first pivot frame member for rotating said lifting frame about said angled axis.

4. The apparatus of claim 3 wherein each of said pivot frame members includes a first portion mounted to said pivot pin and extending radially thereof, and a second portion extending from the respective first portion at an angle relative thereto, the length of said second pivot frame member second portion being sufficiently greater than the length of said first pivot frame member second portion such that said roller frame is oriented in a generally vertical plane when said transport frame is in its lower position.

5. The apparatus of claim 4 wherein said roller frame includes a central rectangular frame having side and end members, an elongated mounting rail attached to each of said end members with said rollers being rotatably located between said rails, each on a roller axis parallel to said central frame side members, a sprocket for each of said rollers, an endless chain extending around and between said sprockets, a drive motor mounted to one of said rails, and a drive sprocket on said motor engaging said chain to drive said chain and said rollers, said first and second pivot frame member second portions being attached to adjacent side and end members of said central rectangular frame respectively.

6. The apparatus of claim 5 wherein said roller frame includes a mounting member extending transversely thereof at a downstream end thereof and an L-shaped stop member secured to said mounting member with one leg thereof being parallel to said mounting rails and the other leg thereof being normal to said one leg and said roller frame.

7. The apparatus of claim 6 wherein said movable clamping means includes an L-shaped frame member extending normal to said roller frame from one mounting rail and carrying adjacent an outer end thereof an elongated bar pivotally connected thereto, hydraulic cylinder means connected to said elongated bar at a proximal end thereof and to said clamping means frame member, and a transverse clamping bar pivotally connected centrally thereof to a distal end of said elongated bar for applying a clamping force to an adjacent side wall of a bale and forcing the bale against said roller frame and said rollers.

8. The apparatus of claim 6 wherein said movable clamping means includes an elongated bar pivotally connected to a distal end of said other leg of said stop member, hydraulic cylinder means connected to said elongated bar at a proximal end thereof and to said other leg, and a clamping bar pivotally connected centrally thereof to a distal end of said elongated bar for applying a clamping force to an adjacent side wall of a bale and forcing the bale against said roller frame and said rollers.

9. The apparatus of claim 6 wherein each of said rollers includes a plurality of circumferentially spaced parallel elongated ribs on an outer surface thereof.

10. The apparatus of claim 1 wherein said transport frame is pivotally mounted to a mounting bar which in turn is pivotally mounted to one side of said transport vehicle and is provided with hydraulic cylinder means for pivoting said mounting bar between a lowered working position and a pivoted travel position whereby in said latter position said transport frame is raised to be oriented generally vertically of said transport vehicle.

\* \* \* \* \*